United States Patent
Hessler et al.

(10) Patent No.: US 11,323,300 B2
(45) Date of Patent: May 3, 2022

(54) SYSTEMS AND METHODS FOR PHASE NOISE TRACKING REFERENCE SIGNAL SEQUENCE GENERATION USING DEMODULATION REFERENCE SIGNALS

(71) Applicant: Telefonaktiebolaget LM Ericsson (publ), Stockholm (SE)

(72) Inventors: Martin Hessler, Linköping (SE); Robert Baldemair, Solna (SE); Lars Lindbom, Karlstad (SE); Henrik Sahlin, Mölnlycke (SE); Niclas Wiberg, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 710 days.

(21) Appl. No.: 16/076,038

(22) PCT Filed: Feb. 9, 2017

(86) PCT No.: PCT/SE2017/050130
§ 371 (c)(1),
(2) Date: Aug. 7, 2018

(87) PCT Pub. No.: WO2017/138880
PCT Pub. Date: Aug. 17, 2017

(65) Prior Publication Data
US 2021/0194744 A1    Jun. 24, 2021

Related U.S. Application Data

(60) Provisional application No. 62/292,990, filed on Feb. 9, 2016.

(51) Int. Cl.
*H04L 27/26* (2006.01)
*H04L 5/00* (2006.01)

(52) U.S. Cl.
CPC .......... *H04L 27/2613* (2013.01); *H04L 5/001* (2013.01); *H04L 5/0051* (2013.01);
(Continued)

(58) Field of Classification Search
None
See application file for complete search history.

(56) References Cited

U.S. PATENT DOCUMENTS

| 7,873,710 B2 | 1/2011 | Kiley et al. |
| 2014/0321406 A1 | 10/2014 | Marinier et al. |

(Continued)

FOREIGN PATENT DOCUMENTS

| CN | 1859343 A | 11/2006 |
| CN | 103733552 A | 4/2014 |

(Continued)

OTHER PUBLICATIONS

Korean Intellectual Property Office Notice of Preliminary Rejection issued for Patent Application No. 10-2020-7027014—dated Oct. 16, 2020.

(Continued)

*Primary Examiner* — Otis L Thompson, Jr.
(74) *Attorney, Agent, or Firm* — Baker Botts, LLP

(57) ABSTRACT

A user equipment (910) is provided for use in a cellular network. The user equipment includes a transceiver (1010), a processor (1020), and a memory (1030). The user equipment (910) is configured to determine, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned (Continued)

to the PNT-RS in the subcarrier. The data transmission is transmitted using the DMRS resulting signal and the PNT-RS.

20 Claims, 14 Drawing Sheets

(52) U.S. Cl.
CPC ...... *H04L 27/2607* (2013.01); *H04L 27/2675* (2013.01); *H04L 5/0007* (2013.01)

(56) References Cited

U.S. PATENT DOCUMENTS

| | | |
|---|---|---|
| 2015/0358132 A1 | 12/2015 | Wallen et al. |
| 2017/0294926 A1* | 10/2017 | Islam .................. H04W 72/042 |
| 2018/0041321 A1* | 2/2018 | Guo ....................... H04L 5/0048 |
| 2018/0227929 A1* | 8/2018 | Yoo ..................... H04W 72/085 |
| 2018/0287759 A1 | 10/2018 | Kundargi et al. |
| 2019/0052433 A1* | 2/2019 | Yoo ........................ H04W 76/27 |
| 2019/0053072 A1 | 2/2019 | Kundargi et al. |
| 2019/0097774 A1 | 3/2019 | Li et al. |
| 2019/0116588 A1 | 4/2019 | Xiong et al. |
| 2019/0149299 A1 | 5/2019 | Lee et al. |
| 2021/0058207 A1* | 2/2021 | Lee ....................... H04L 5/0053 |

FOREIGN PATENT DOCUMENTS

| | | |
|---|---|---|
| CN | 104321994 A | 1/2015 |
| JP | 2011193383 A | 9/2011 |
| JP | 2013219501 A | 10/2013 |
| WO | 2004075451 A1 | 9/2004 |
| WO | 2013 070144 A1 | 5/2013 |
| WO | 2014024502 A1 | 2/2014 |
| WO | 2014 070411 A1 | 5/2014 |
| WO | 2016 000915 A1 | 1/2016 |

OTHER PUBLICATIONS

3GPP TSG 36.211 V12.5.0, 3rd Generation Partnership Project; Technical Specification Group Radio Access Network; Evolved Universal Terrestrial Radio Access (E-UTRA); Physical channels and modulation (Release 12)—2015.

Extended European Search Report issued for Application No./Patent No. 20169102.9-1205—dated Jun. 9, 2020.

3GPP TSG RAN WG1 Meeting #82bis; Malmo, Sweden; Source: CATT; Title: DMRS Enhancement in PC5-based V2V (R1-155223)—Oct. 5-9, 2015.

Summary of Office JP Office Action issued for Japanese Patent Application No. 2018-535284—dated Jul. 18, 2019.

3GPP TSG RAN WG1 Meeting #83; Anaheim, USA; Source: LG Electronics; Title: Discussion on DMRS density and structure to handle high Doppler case (R1-157436)—Nov. 15-22, 2015.

PCT International Search Report for International application No. PCT/SE2017/050130—dated Apr. 28, 2017.

PCT Written Opinion of the International Searching Authority for International application No. PCT/SE2017/050130—dated Apr. 28, 2017.

Notice of Preliminary Rejection issued by the Korean Intellectual Property Office for Application No. 10-2018-7022827—dated Feb. 6, 2020.

3GPP TSG RAN WG1 Meeting #83; Anaheim, USA; Source: Huawei, HiSilicon; Title: DMRS enhancement for V2V (R1-156908)—Nov. 15-22, 2015.

3GPP TSG RAN WG1 Meeting #84; St. Julian's, Malta; Source: ITRI; Title: Considerations of DMRS Enhancement in the High Doppler Case for V2V Services based on LTE Sidelink (R1-160663)—Feb. 15-18, 2016.

Chinese Office Action issued for Chinese Patent Application No. 2017800099748—dated Jul. 31, 2020.

Examination Report issued by the Intellectual Property India for Application No. 202018043684—dated Nov. 12, 2021.

\* cited by examiner

SYSTEMS AND METHODS FOR PHASE NOISE TRACKING REFERENCE SIGNAL SEQUENCE GENERATION USING DEMODULATION REFERENCE SIGNALS

PRIORITY

This nonprovisional application is a U.S. National Stage Filing under 35 U.S.C. § 371 of International Patent Application Serial No. PCT/SE2017/050130 filed Feb. 9, 2017, and entitled "SYSTEMS AND METHODS FOR PHASE NOISE TRACKING REFERENCE SIGNAL SEQUENCE GENERATION USING DEMODULATION REFERENCE SIGNALS" which claims priority to U.S. Provisional Patent Application No. 62/292,990 filed Feb. 9, 2016, both of which are hereby incorporated by reference in their entirety.

TECHNICAL FIELD

The present disclosure relates, in general, to wireless communications and, more particularly, to systems and methods for Phase Noise Tracking Reference Signal (PNT-RS) sequence generation using Demodulation Reference Signals (DMRS).

BACKGROUND

Communications between a transmitter and receiver generally require some form of synchronization in time and/or frequency before transmissions of messages can be received reliably. In cellular systems, such as Long Term Evolution (LTE), base stations broadcast narrowband synchronization signals regularly in time. These synchronization signals allow wireless devices accessing the system to perform an initial cell search. For example, wireless devices may go through a synchronization procedure that includes finding carrier frequency, time reference instants, and cell identity. A LTE wireless device that has performed initial cell search and identified the cell identity can then complete the initial synchronization in downlink by making a fine synchronization on cell specific reference signals that are transmitted over the system bandwidth and more frequently in time than the synchronization signals. The wireless device connects to the network via a random access procedure in which uplink time synchronization will be established and communications between the device and the base station can begin. Due to oscillator drifting at both transmitter and receiver sides, the wireless device needs to regularly perform fine frequency synchronization in downlink during the communications with the base station.

A lean frame structure design for NX without cell-specific reference signals (CRS) has been proposed where instead reference signals required for fine synchronization and demodulation of a downlink (DL) physical data channel (PDCH) are embedded into the PDCH transmission. FIG. 1 illustrates the DL transmissions of PDCH and associated physical downlink control channel (PDCCH), carrying an assignment or a grant. More specifically, FIG. 1 illustrates that the first Orthogonal Frequency Division Multiplexing (OFDM) symbol of a subframe contains PDCCH and following OFDM symbols contain PDCHs.

As also illustrated in FIG. 1, transmissions of PDCH may span over multiple subframes in the case of subframe aggregation or be confined to one subframe. A wireless device, which may also be referred to as user equipment (UE), detects PDCCH addressed to the UE and derives from the scheduling information PDCH related information. A UE is not aware of PDCCH transmissions to other UEs where a PDCCH to one particular user is carried on a subset of OFDM subcarriers. The mapping of PDCCH can either be distributed or localized with latter being illustrated in FIG. 1. The number of OFDM symbols within a subframe is a system design parameter and may very well be larger than the 4 used in the depicted example.

In the illustrated example, PDCCH and PDCH have their own reference signals for demodulation which mainly refer to Demodulation Reference Signals (DMRS) but could potentially also refer to other types of reference signals as will be discussed herein. The DMRS should be transmitted early in the subframe to enable the receiver to perform early channel estimation and by that reduce receiver processing time.

In the context of NX, time-synchronization is done using a first reference signal (e.g., a Time Synchronization Signal (TSS)) and coarse-frequency-sync using the same first reference signal or a second signal (e.g., Frequency Synchronization Signal). One may observe that these signals are not intended to provide a very accurate synchronization, neither in time nor in frequency. The time-error can be handled by the cyclic-prefix in an OFDM system and the frequency error by having sufficient sub-carrier spacing. However, in order to not limit the performance of higher rank transmissions of PDCH in conjunction with higher modulation (such as 64 and 256 QAM) schemes, better frequency-synchronization is needed. State of the art solutions (e.g. as in LTE) reuse DMRS or CRS for this purpose.

In 5G system deployments at higher carrier frequencies, the radio link will exhibit some new properties compared to LTE at lower carrier frequencies. One of the fundamental changes is that the phase noise problem is scaled with frequency which introduces a need for a new phase reference signal to mitigate phase noise that is common for all subcarriers within an OFDM symbol. This reference signal may be needed both in uplink and downlink. It is foreseen that this signal can be used for both fine carrier frequency-synchronization and phase noise compensation. Where the second is the focus, the reference signal may be referred to as the Phase Noise Tracking Reference Signal (PNT-RS).

FIG. 2 illustrates an example time-frequency grids containing DMRS and PNT-RSs. The illustrated design is just one example since the design has not yet been specified in 3GPP. As depicted, the reference signal is transmitted time continuously and a length 8 cover-code is assumed to be used to create 8 orthogonal DMRS resources. The DMRS resource can be enumerated 0 . . . 7 and can be considered to be 8 DMRS ports. In the illustrated example, four different PNT-RS are depicted to support four transmitters with different phase noise.

The PNT-RS is transmitted jointly with the DMRS. As such, the PNT-RS is also transmitted jointly with the PDCH on a subset of the subcarriers that are used to transmit the DMRS. The DMRS is here assumed to be transmitted in one or a few OFDM symbols early within a subframe or within a subframe aggregation whereas the PNT-RS may be possibly transmitted in every OFDM symbol. The density of the DMRS in the frequency domain is significantly higher than the corresponding density of the PNT-RS. Thus, the set of subcarriers occupied by DMRS is significantly higher than the set of subcarriers occupied by the PNT-RS. In contrast to radio channels that are often non-flat over the transmission bandwidth, the phase ambiguity caused by the phase noise will impact all subcarriers in a similar way. The reasoning for transmitting PNT-RS on more than one subcarrier is basically then to obtain frequency diversity as well as increasing the processing gain.

Multi-layer transmissions of PDCH require a set of orthogonal DMRS which can be constructed by either interleaved Frequency Division Multiplexing (FDM) or Code Division Multiplexing (CDM) or both. Interleaved FDM or CDM may also be known as combs in LTE. CDM may refer to Orthogonal Cover Codes (OCC) based on, for example, Walsh-Hadamard codes or DFT or any other schemes that may provide orthogonality in code domain. In certain embodiments, OCC in time domain may be less suitable when phase noise needs to be tracked within the subframe. Moreover, DMRS needs to be transmitted in multiple OFDM symbols which may not always be the case in NX. Therefore, if sub-carriers are blocked by PNT-RS, the maximum number of available DMRS may be limited.

In a traditional synchronized radio system, such as, for example, LTE, some signals are always present to allow the UE to find the signals without having to communicate with the network first. Examples of such signals include Primary Synchronization Signal (PSS), Secondary Synchronization Signal (SSS), and CRS. These types of signals allow the UE to keep time-frequency sync with the network. However, the always-on signals add some complexity to the radio system, result in bad energy performance, and provide constant interference.

Some more recent solutions include a lean system design that removes said signals. A problem with these designs is that the sync-procedure becomes more complicated and overhead has increased in terms of PNT-RSs using a large fraction of the spectrum at the cost of decreased data rates. For example, reusing DMRS is inefficient as the needed time-density is high for accurate phase noise tracking. The DMRS design takes frequency selectivity into account implying that the resource density in frequency needs to be rather high for demodulation performance. Thus, if the same signal is used for both demodulation and phase noise tracking, unnecessary high overhead may be created.

Accordingly, a separate PNT-RS may be used. However, this creates a problem in that the sub-carriers used for phase noise tracking are blocked as the OFDM symbols used for DMRS also contain phase noise and needs a phase noise reference. Thus, an early placement of a larger number of DMRS can be problematic if a large number of orthogonal DMRS are needed with early DMRS.

SUMMARY

To address the foregoing problems with existing solutions, disclosed is methods and systems for Phase Noise Tracking Reference Signal (PNT-RS) sequence generation using Demodulation Reference Signals (DMRS). More specifically, PNT-RS sequences may be generated from the effective DMRS signal. Accordingly, effective over all layers, the symbol transmitted in the intersection of the PNT-RS and DMRS may be used and copied to all other resource elements assigned to PNT-RS.

According to certain embodiments, a user equipment is provided for use in a cellular network. The user equipment includes a transceiver, a processor, and a memory. The user equipment is configured to determine, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method by a user equipment in a cellular network includes determining, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a network node is provided for use in a cellular network. The network node includes a transceiver, a processor, and a memory. The network node is configured to determine, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method by a network node in a cellular network includes determining, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method in a wireless transmitter for generating a PNT-RS includes determining a DMRS and a PNT-RS mapping for a data transmission. A DMRS resulting signal is generated from a subset of DMRS for a first resource element in a subcarrier. The DMRS resulting signal signal is copied from the first resource element to a second resource element assigned to the PNT-RS in the subcarrier. The data transmission is transmitted using the DMRS resulting signal and the PNT-RS.

According to certain embodiments, a wireless transmitter for generating a PNT-RS includes a transceiver, a processor, and a memory. The wireless transmitter is configured to determine a DMRS and a PNT-RS mapping for a data transmission. A DMRS resulting signal is generated from a subset of the DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method in a wireless receiver for tracking PNT-RS includes performing a first channel estimate on a set of DMRS in a first Orthogonal Frequency Division Multiplexing (OFDM) symbol in a sub-carrier. A first phase noise reference is determined in a first resource element in the first OFDM symbol in the sub-carrier. A second phase noise reference is extracted in a second resource element in a second OFDM symbol in the sub-carrier. A second channel estimate is generated by performing a phase noise compensation of the first channel estimate using said first and second phase reference. Data is received in the second OFDM symbol using the second channel estimate.

According to certain embodiments, a wireless receiver for tracking phase noise tracking reference signal (PNT-RS) includes a transceiver, a processor, and a memory. The wireless receiver is configured to perform a first channel estimate on a set of demodulation reference signals (DMRS) in a first Orthogonal Frequency Division Multiplexing (OFDM) symbol in a sub-carrier. A first phase noise reference is determined in a first resource element in the first OFDM symbol in the sub-carrier. A second phase noise reference is extracted in a second resource element in a second OFDM symbol in the sub-carrier. A second channel estimate is generated by performing a phase noise compensation of the first channel estimate using said first and second phase reference. Data is received in the second OFDM symbol using the second channel estimate.

Certain embodiments of the present disclosure may provide one or more technical advantages. For example, certain embodiments may enable an overhead reduction and better utilization of resources for DMRS, enabling a high number of DMRS early in a sub-frame even in the presence of a substantial number of orthogonal PNT-RS. There is no other known solution when using all resource elements in an OFDM symbol for DMRS while enabling phase noise tracking. Consider, for example, an uplink (UL) (or downlink (DL)) Multi User Multiple Input Multiple Output (MU-MIMO) system with four or more receiver antennas. Therefore, the benefits of having only DMRS in an OFDM symbol such as better peak to average and nice frequency interpolation properties, frequency domain combs are blocked without the herein disclosed systems and techniques.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
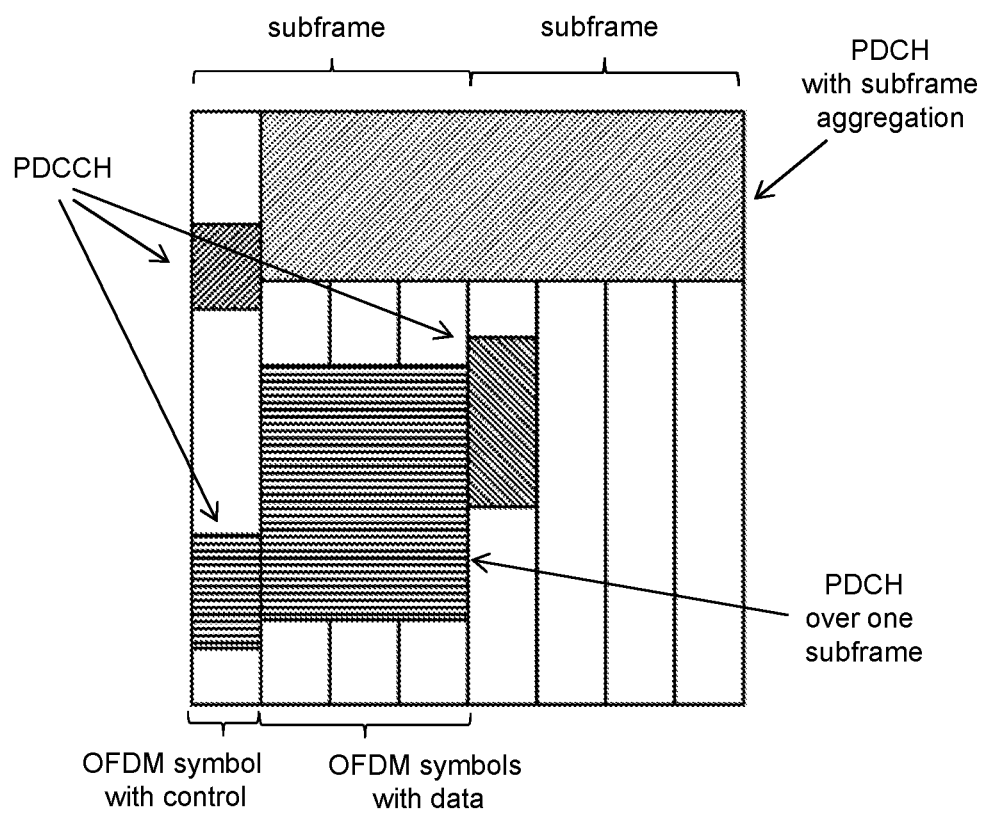
FIG. 1 is block diagram illustrating downlink transmissions of Physical Data Channel (PDCH) and associated Physical Downlink Control Channel (PDCCH) for carrying an assignment or grant.
Figure 2:
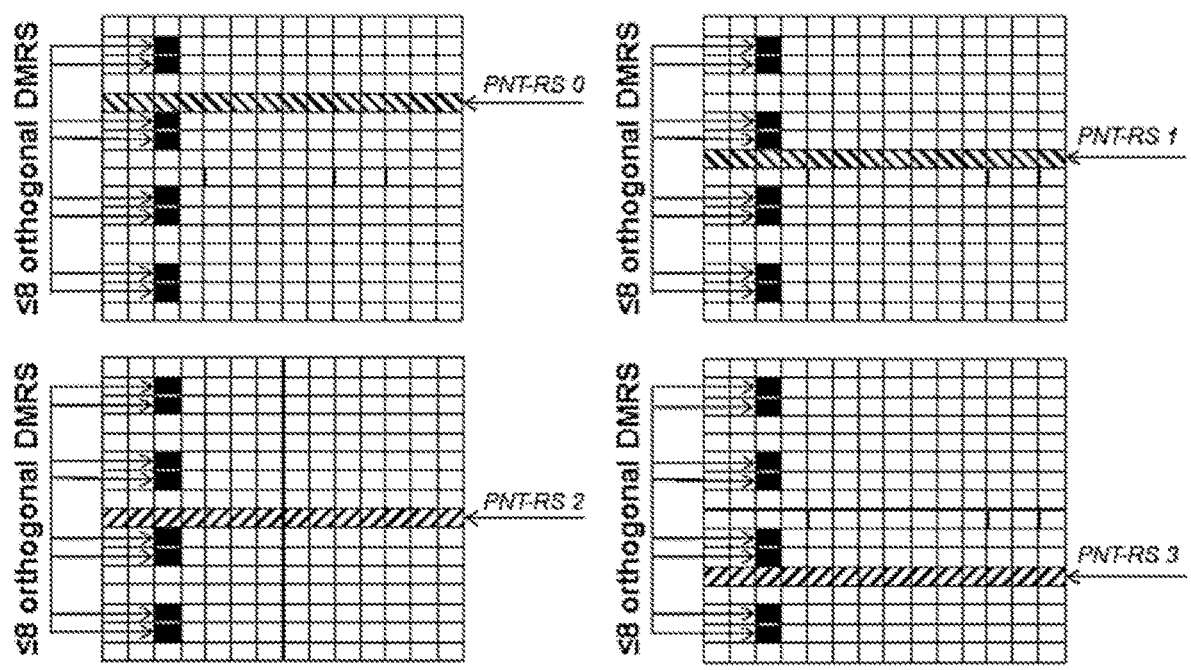
FIG. 2 is a block diagram illustrating example time-frequency grids containing demodulated reference signals (DMRS) and phase noise tracking reference signals (PNT-RS)
Figure 3:
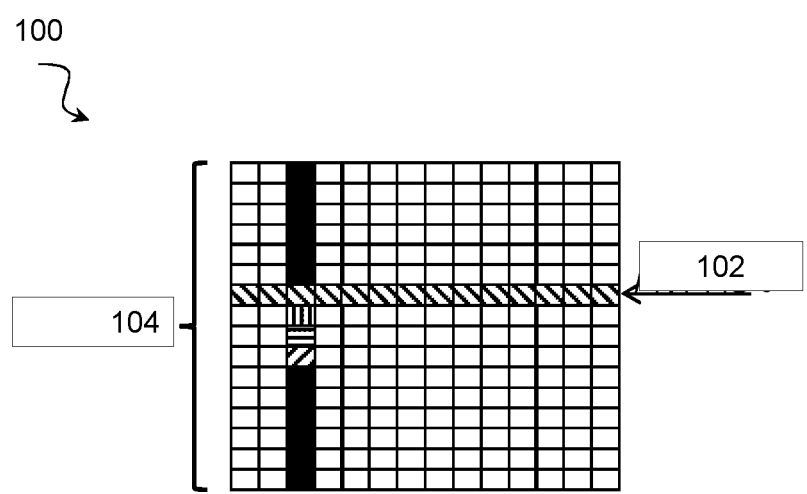
FIG. 3 is a block diagram illustrating an example time-frequency grid including copied DMRS symbol for phase noise tracking, in accordance with certain embodiments.

According to certain embodiments, the Phase Noise Tracking Reference Signal (PNT-RS) sequence is generated from the transmitted effective Demodulation Reference Signal (DMRS). More specifically, the DMRS symbol transmitted in the intersection of the PNT-RS and DMRS are used and copied to all other resource elements assigned to PNT-RS. FIG. 3 illustrates an example time-frequency grid including copied DMRS symbol for phase noise tracking. As shown, the PNT-RS 0 is depicted as a copy of the DMRS resource element in the same sub-carrier.

In certain embodiments, the DMRS signal may be copied as the complex value transmitted in the resource element. This implies that the receiver may assume that the signal is a known signal that is copied and time shifted to the second OFDM symbol. In certain embodiments, the receiver may assume that the signal is time-continuous. For example, each copy may be shifted with a cyclic prefix (CP) duration such that each previous copy of the PNT-RS can act as a CP.

Figure 4:
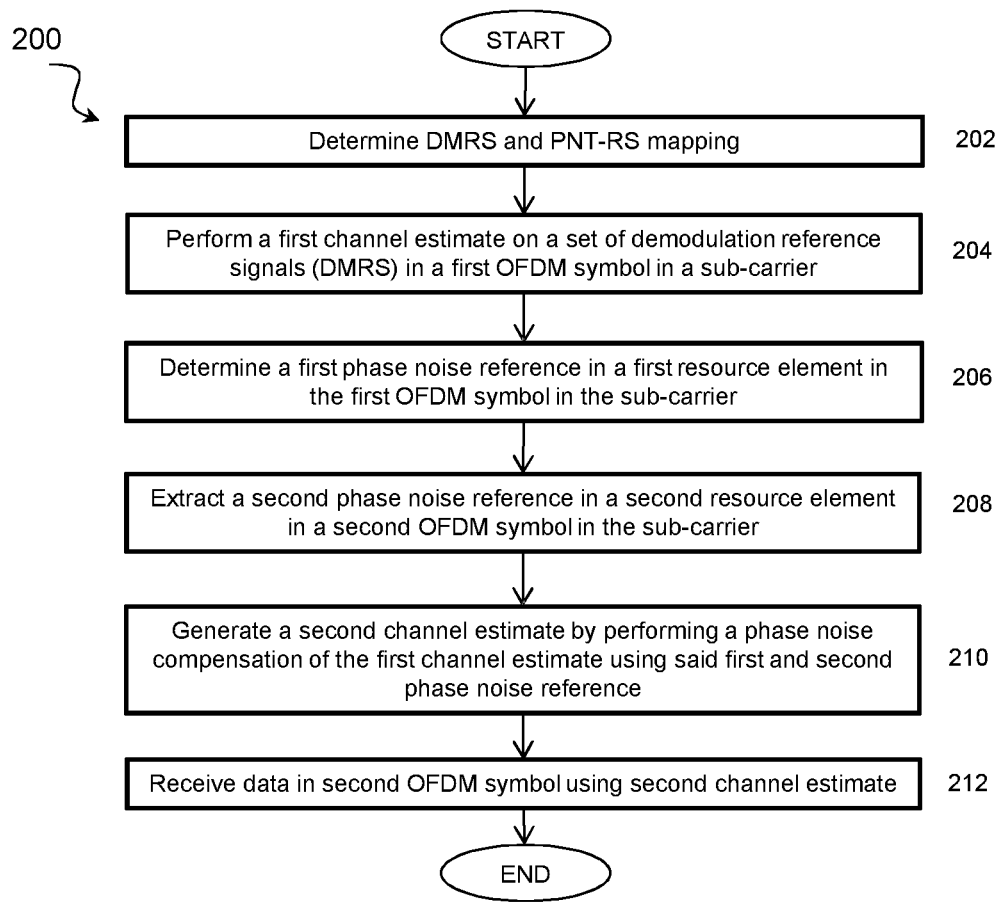
FIG. 4 is a flow diagram of an example method by a wireless receiver for tracking phase noise using a PNT-RS, in accordance with certain embodiments.

Example techniques for phase noise tracking may be implemented by both the receiver and the transmitter. FIG. 4 illustrates is a flow diagram of an example method 200 by a wireless receiver for tracking phase noise using a PNT-RS, in accordance with certain embodiments. In certain embodiments, the wireless receiver may comprise a network node or a wireless device, examples of which are described below in more detail with regard to FIGS. 11-13.

The method begins at step 202 when the wireless receiver determines DMRS and PNT-RS mapping. In certain embodiments, the set of DMRS may include a plurality of resource elements associated with the first OFDM symbol.

At step 204, a first channel estimate is performed on a set of DMRS. The set of DMRS may include a first resource element used as a first phase noise reference on a sub-carrier in a first OFDM symbol. Wireless receiver may then determine a first phase noise reference in a first resource element in the first OFDM symbol in the sub-carrier at step 206. In certain embodiments, the PNT-RS may be continuous in all OFDM symbols of the subcarrier.

At step 208, the wireless receiver extracts a second phase noise reference in a second resource element in a second OFDM symbol on the sub-carrier. Using the first and second phase noise reference, a second channel estimated may be generated at step 210 by performing a phase noise compensation of the first channel estimate for said second OFDM symbol. At step 212, data is received in the second OFDM symbol using the second channel estimate.

Figure 5:
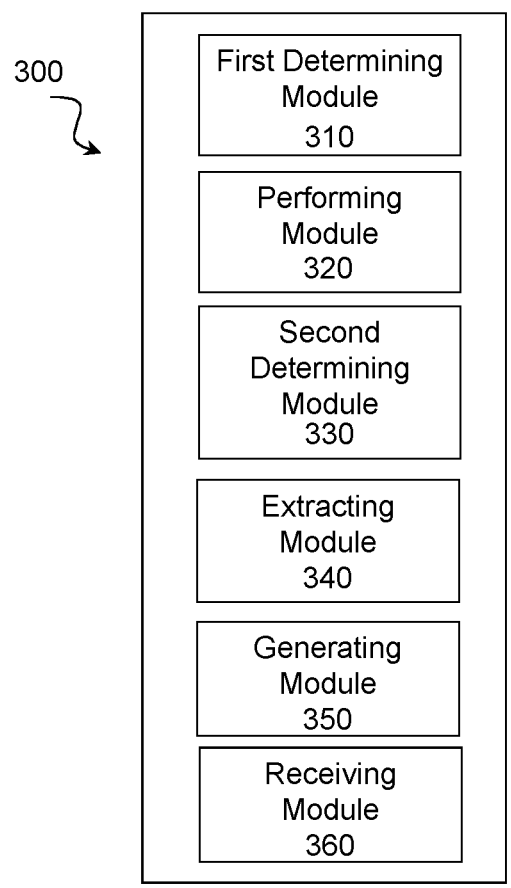
FIG. 5 is a block diagram illustrating an example virtual computing device for tracking phase noise, in accordance with certain embodiments.

In certain embodiments, the method for tracking PNT-RS as described above may be performed by a virtual computing device. FIG. 5 is a block diagram illustrating an example virtual computing device 300 for tracking PNT-RS, in accordance with certain embodiments. As depicted, virtual computing device 300 may include modules for performing steps similar to those described above with regard to the method illustrated and described in FIG. 4. For example, virtual computing device 300 may include a first determining module 310, a performing module 320, a second determining module 330, an extracting module 340, a generating module 350, a receiving module 360, and any other suitable modules for tracking PNT-RS. In some embodiments, one or more of the modules may be implemented by a processor, such as the exemplary processors described below with respect to FIGS. 12 and 13. Additionally, it is recognized that, in certain embodiments, the functions of two or more of the various modules described herein may be combined into a single module.

The first determining module 310 may perform certain or all of the determining functions of virtual computing device 300. For example, in certain embodiments, first determining module 310 may determine a DMRS and PNT-RS mapping. In a particular embodiment, first determining module 310 may receive the DMRs and PNT-RS mapping from a network node. In another embodiment, first determining module 310 may acquire the DMRS and PNT-RS mapping from a wireless device.

The performing module 320 may perform the performing certain or all of the functions of virtual computing device 300. For example, in certain embodiments, first performing module 320 may perform a first channel estimate on a set of DMRS in a first OFDM symbol in a sub-carrier.

The second determining module 330 may perform certain or all of the determining functions of virtual computing device 300. For example, in certain embodiments, second determining module 330 may determine a first phase noise reference in a first resource element in the first OFDM symbol in the sub-carrier.

The extracting module 340 may perform certain or all of the extracting functions of virtual computing device 300. For example, in certain embodiments, extracting module 340 may extract a second phase noise reference in a second resource element in a second OFDM symbol in the sub-carrier.

The generating module 360 may perform certain or all of the generating functions of virtual computing device 300. For example, in certain embodiments, generating module 360 may generate a second channel estimate by performing a phase noise compensation of the first channel estimate using said first and second phase noise reference.

The receiving module 380 may perform certain or all of the receiving functions of virtual computing device 300. For example, in certain embodiments, receiving module 380 may receive data in the second OFDM symbol using the second channel estimate.

Other embodiments of virtual computing device 300 may include additional components beyond those shown in FIG. 5 that may be responsible for providing certain aspects of the receiver's functionality, including any of the functionality described above and/or any additional functionality (including any functionality necessary to support the solutions described above). The receiver may include components having the same physical hardware but configured (e.g., via programming) to support different radio access technologies, or may represent partly or entirely different physical components than those depicted.

Figure 6:
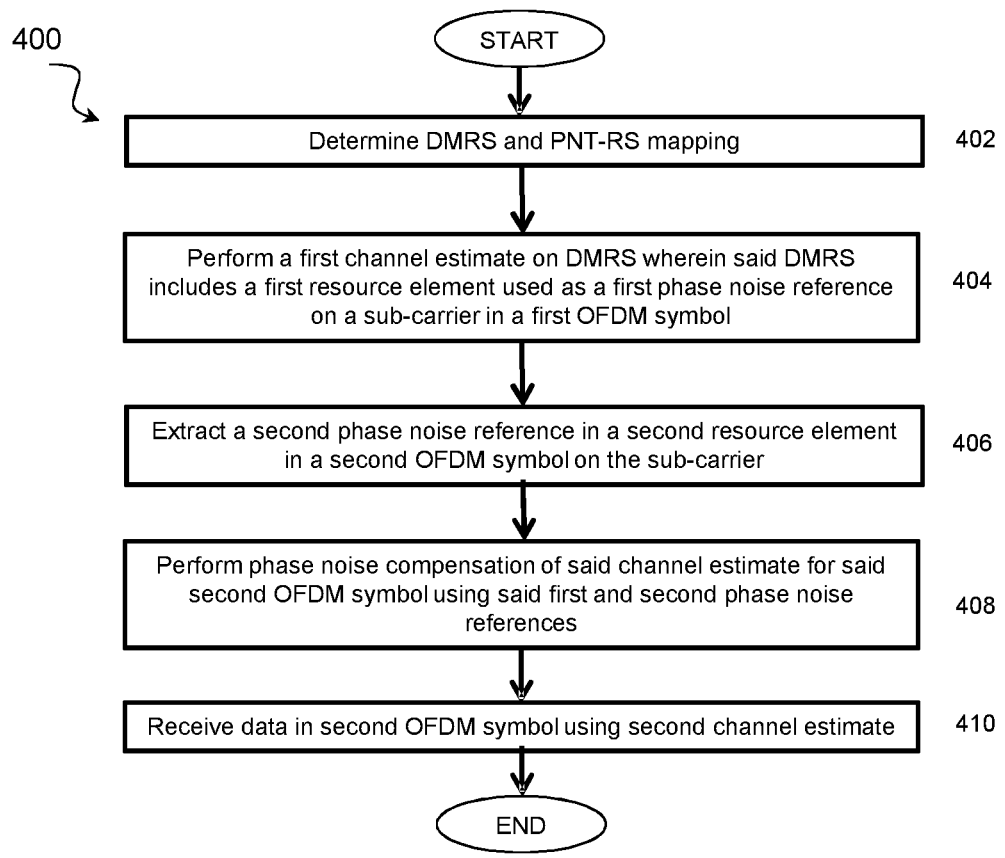
FIG. 6 is a flow diagram of another example method by a wireless receiver for tracking phase noise using a PNT-RS, in accordance with certain embodiments.

FIG. 6 is a flow diagram of another example method 400 by a wireless receiver for tracking phase noise using PNT-RS, in accordance with certain embodiments. In certain embodiments, the wireless receiver may include a network node or a wireless device, example embodiments of which are described in more detail below with regard to FIGS. 12 and 13. The method 400 begins at step 402 when the wireless receiver determines a DMRS and PNT-RS mapping.

At step 404, a first channel estimate is performed on DMRS. The DMRS may include a first resource element used as a first phase noise reference on a sub-carrier in a first OFDM symbol. In a particular embodiment, for example, wireless receiver may perform a first channel estimate on a set of demodulation reference signals and determine a first phase noise reference in a first resource element in a first OFDM symbol in a sub-carrier.

At step 406, a second phase noise reference in a second resource element in a second OFDM symbol on the sub-carrier is extracted.

At step 408, phase noise compensation of said channel estimate for said second OFDM symbol is performed using the first and second phase noise references. For example, wireless receiver may generate a second channel estimate by performing phase noise compensation of the first channel estimate using the first and second phase references.

At step 410, data is received in the second OFDM symbol using the second channel estimate.

Figure 7:
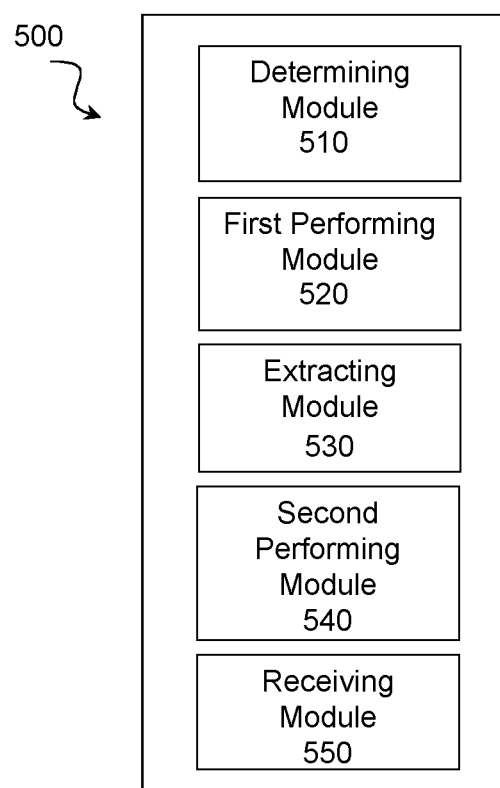
FIG. 7 is a block diagram illustrating another example virtual computing device for tracking phase noise, in accordance with certain embodiments.

In certain embodiments, the method for tracking PNT-RS as described above may be performed by a virtual computing device. FIG. 7 is a block diagram illustrating an example virtual computing device 500 for tracking PNT-RS, in accordance with certain embodiments. As depicted, virtual computing device 500 may include modules for performing steps similar to those described above with regard to the method illustrated and described in FIG. 6. For example, virtual computing device 500 may include a determining module 510, a first performing module 520, an extracting module 530, a second determining module 540, a receiving module 550, and any other suitable modules for tracking PNT-RS. In some embodiments, one or more of the modules may be implemented by a processor, such as the exemplary processors described below with respect to FIGS. 12 and 13. Additionally, it is recognized that, in certain embodiments, the functions of two or more of the various modules described herein may be combined into a single module.

The determining module 510 may perform certain or all of the determining functions of virtual computing device 500. For example, in certain embodiments, determining module 510 may determine a DMRS and PNT-RS mapping. In a particular embodiment, first determining module 510 may receive the DMRs and PNT-RS mapping from a network node. In another embodiment, determining module 510 may acquire the DMRS and PNT-RS mapping from a wireless device.

The first performing module 520 may perform certain or all of the performing functions of virtual computing device 500. For example, in certain embodiments, first performing module 520 may perform a first channel estimate on the DMRS. In certain embodiments, the DMRS may include a set or subset of DMRS that includes a first resource element used as a first phase noise reference on a sub-carrier in a first OFDM symbol.

The extracting module 530 may perform certain or all of the extracting functions of virtual computing device 500. For example, in certain embodiments, extracting module 530 may extract a second phase noise reference in a second resource element in a second OFDM symbol on the sub-carrier.

The second performing module 540 may perform certain or all of the performing functions of virtual computing device 500. For example, in certain embodiments, second performing module 540 may perform phase noise compensation of said channel estimate for said second OFDM symbol using the first and second phase noise references.

The receiving module 550 may perform certain or all of the receiving functions of virtual computing device 500. For example, in certain embodiments, receiving module 550 may receive data in the second OFDM symbol using the second channel estimate.

Other embodiments of virtual computing device 500 may include additional components beyond those shown in FIG. 7 that may be responsible for providing certain aspects of the receiver's functionality, including any of the functionality described above and/or any additional functionality (including any functionality necessary to support the solutions described above). The receiver may include components having the same physical hardware but configured (e.g., via programming) to support different radio access technologies, or may represent partly or entirely different physical components than those depicted.

Figure 8:
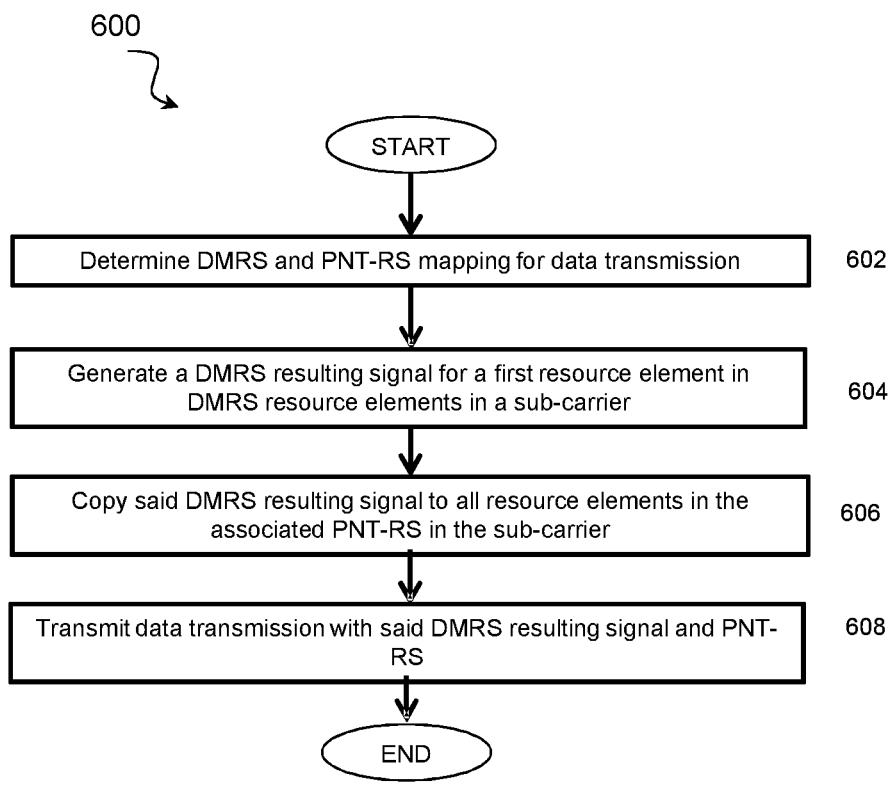
FIG. 8 is a flow diagram of an example method by a wireless transmitter for generating PNT-RS, in accordance with certain embodiments.

FIG. 8 is a flow diagram of an example method 600 by a wireless transmitter for generating PNT-RS, in accordance with certain embodiments. In certain embodiments, the wireless transmitter may include a network node or a wireless device, example embodiments of which are described in more detail below with regard to FIGS. 12 and 13. The method 600 begins at step 602 when the wireless transmitter determines a DMRS and PNT-RS mapping for a data transmission.

At step 604, the wireless transmitter generates a DMRS resulting signal for a first resource element in a set of DMRS resources in a sub-carrier. In certain embodiments, the DMRS resulting signal may be a generated from a subset of the DMRS that includes at least one DMRS and may include all of the DMRSs, in a particular embodiment. In certain embodiments, the first resource element may be associated with a first OFDM symbol and all resource elements associated with the first OFDM may be used to generate the DMRS resulting signal.

At step 606, the wireless transmitter copies the DMRS resulting signal to resource elements in the associated PNT-RS in the sub-carrier. In certain embodiments, the wireless transmitter may copy the DMRS resulting signal from a first resource element to at least a second resource element that is assigned to the PNT-RS in the subcarrier.

In certain embodiments, the PNT-RS may be continuous in all OFDM symbols in the subcarrier, and the wireless transmitter may copy the DMRS resulting signal to all resource elements assigned to all OFDM symbols assigned to the PNT-RS in the subcarrier. For example, in a particular embodiment, a complex value may be copied from the first resource element to each of the OFDM symbols of the subcarrier mapped to the PNT-RS.

In certain embodiments, the copy from the first resource element may be time-shifted across the subcarrier. For example, where a complex value is copied from the first resource element to each of the OFDM symbols of the subcarrier mapped to the PNT-RS, the complex value may time-shifted. In a particular embodiment, each copy of the complex value across the sub-carrier mapped to PNT-RS may be shifted with a CP duration.

In one particular embodiment, for example, the resulting signal may be generated using an OCC of a length associated with multiple adjacent OFDM symbols. Copying the first resource element may include, for each one of the plurality of adjacent OFDM symbols, copying a respective DMRS resulting signal to a respective OFDM symbol.

At step 608, the wireless transmitter transmits the data transmission with the DMRS resulting signal and the PNT-RS.

Figure 9:
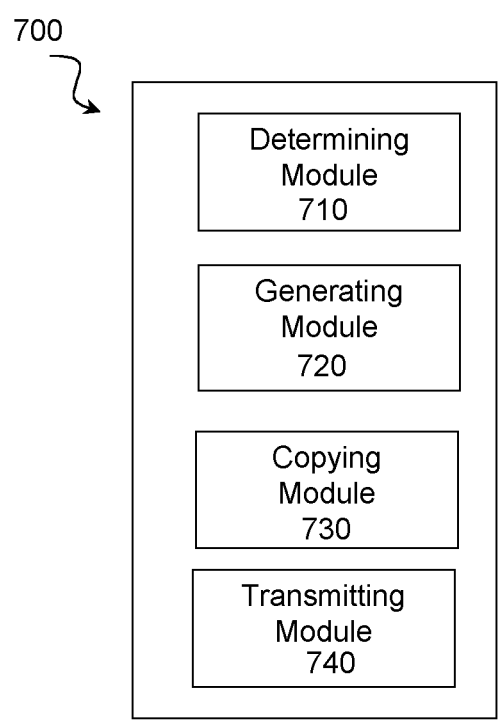
FIG. 9 is a block diagram illustrating an example virtual computing device for generating PNT-RS, in accordance with certain embodiments.

In certain embodiments, the method for generating PNT-RS as described above may be performed by a virtual computing device. FIG. 9 is a block diagram illustrating an example virtual computing device 700 for generating PNT-RS, in accordance with certain embodiments. As depicted, virtual computing device 700 may include modules for performing steps similar to those described above with regard to the method illustrated and described in FIG. 8. For example, virtual computing device 700 may include a determining module 710, a generating module 720, a copying module 730, a transmitting module 740, and any other suitable modules for generating PNT-RS. In some embodiments, one or more of the modules may be implemented by a processor, such as the exemplary processors described below with respect to FIGS. 12 and 13. Additionally, it is recognized that, in certain embodiments, the functions of two or more of the various modules described herein may be combined into a single module.

The determining module 710 may perform certain or all of the determining functions of virtual computing device 700. For example, in certain embodiments, determining module 710 may determine a DMRS and PNT-RS mapping. In a particular embodiment, first determining module 510 may receive the DMRs and PNT-RS mapping from a network node. In another embodiment, determining module 510 may acquire the DMRS and PNT-RS mapping from a wireless device.

The generating module 720 may perform certain or all of the generating functions of virtual computing device 700. For example, in certain embodiments, generating module 720 may generate The copying module 730 may perform certain or all of the copying functions of virtual computing device 700. For example, in certain embodiments, copying module 730 may copy The transmitting module 740 may perform the transmitting functions of virtual computing device 700. For example, in certain embodiments, transmitting module 740 may transmit Other embodiments of virtual computing device 700 may include additional components beyond those shown in FIG. 9 that may be responsible for providing certain aspects of the receiver's functionality, including any of the functionality described above and/or any additional functionality (including any functionality necessary to support the solutions described above). The receiver may include components having the same physical hardware but configured (e.g., via programming) to support different radio access technologies, or may represent partly or entirely different physical components than those depicted.

In the scenario where the DMRS are generated using Orthogonal Cover Codes (OCC) in time, the generation of phase-reference can be different for different layers in the transmission depending on which of the time OCC codes the different layers are mapped to. In this case, full phase noise tracking may not be possible. On the other hand, if the phase noise is dominantly of low frequency, an average over two or more adjacent OFDM symbols may be used.

Figure 10:
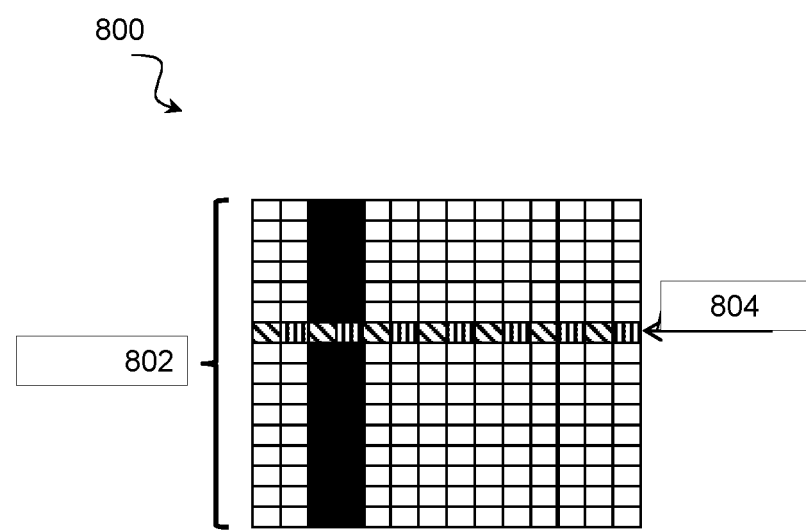
FIG. 10 is a block diagram illustrating an example time-frequency grid including phase noise tracking when using length of two Orthogonal Cover Codes (OCC) in time, in accordance with certain embodiments.

FIG. 10 illustrates an example time-frequency grid 800 including phase noise tracking when using length of two OCC in time, according to certain embodiments. Specifically, phase noise tracking is performed by copying the individual signals from the two OFDM-symbols and repeating these in every second pair of OFDM symbols for the PNT-RS, as shown. Thus, an average over two adjacent OFDM symbols is used.

Certain of the embodiments provided herein are described as being applicable for phase noise compensation. For example, in certain embodiments, the copied DMRS signal can be used to do phase noise compensation. As the transmission is assumed to be contained within the coherence time of the channel, the channel response is not changed between copies of the DMRS signal. If that is not the case, multiple DMRS can be used and the techniques disclosed herein used multiple times within the same transmission. Since the channel is assumed to not change during the transmission time interval, the difference in two copies of the DMRS-signal can be assumed to be due to the phase noise variation between the two OFDM symbols. As a result, this difference can be used to compensate the channel estimate.

In a practical implementation, for example, multiple copies of different copies of the DMRS-signal may be used with proper filtering to remove variations in interference between the copies. This filter kernel is typically tuned to the channel estimate and the expected frequency profile of the phase noise. For example, the filter kernel may use multiple time instances of the PNT-RS if the phase noise is dominated by low frequency content and use only a single instance if high-frequency content is dominating.

Figure 11:
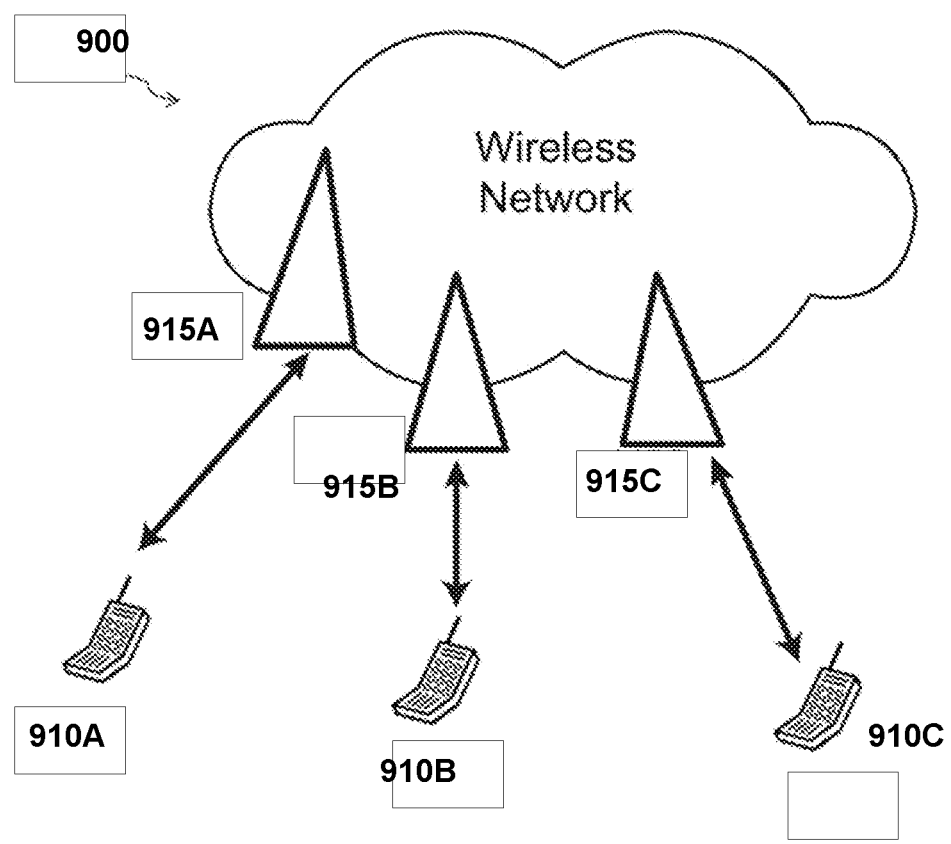
FIG. 11 is a block diagram illustrating an embodiment of a network 100 for phase noise tracking, in accordance with certain embodiments.

The techniques for tracking phase noise as disclosed herein may be implemented by a network. FIG. 11 is a block diagram illustrating an embodiment of a network 900, in accordance with certain embodiments. Network 900 includes one or more wireless devices 910A-C, which may be interchangeably referred to as wireless devices 910 or UEs 910, and network nodes 915A-C, which may be interchangeably referred to as network nodes 915 or eNodeBs (eNBs) 915. A wireless device 910 may communicate with network nodes 915 over a wireless interface. For example, a wireless device 910A may transmit wireless signals to one or more of network nodes 915, and/or receive wireless signals from one or more of network nodes 915. The wireless signals may contain voice traffic, data traffic, control signals, and/or any other suitable information. In some embodiments, an area of wireless signal coverage associated with a network node 915 may be referred to as a cell. In some embodiments, wireless devices 910 may have D2D capability. Thus, wireless devices 910 may be able to receive signals from and/or transmit signals directly to another wireless device. For example, wireless device 910A may be able to receive signals from and/or transmit signals to wireless device 910B.

In certain embodiments, network nodes 915 may interface with a radio network controller (not depicted in FIG. 11). The radio network controller may control network nodes 915 and may provide certain radio resource management functions, mobility management functions, and/or other suitable functions. In certain embodiments, the functions of the radio network controller may be included in network node 915. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 910. Wireless devices 910 may exchange certain signals with the core network node using the non-access stratum layer. In non-access stratum signaling, signals between wireless devices 910 and the core network node may be transparently passed through the radio access network. In certain embodiments, network nodes 915 may interface with one or more network nodes over an internode interface. For example, network nodes 915A and 915B may interface over an X2 interface (not depicted).

As described above, example embodiments of network 900 may include one or more wireless devices 910, and one or more different types of network nodes 915 capable of communicating (directly or indirectly) with wireless devices 910. Wireless device 910 may refer to any type of wireless device capable of communicating with network nodes 915 or another wireless device 910 over radio signals. Examples of wireless device 910 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 910 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node.

The terminology such as network node and UE should be considering non-limiting and does in particular not imply a certain hierarchical relation between the two; in general "eNodeB" could be considered as device 1 and "UE" device 2, and these two devices communicate with each other over some radio channel. Example embodiments of wireless devices 810, network nodes 815, and other network nodes (such as radio network controller or core network node) are described in more detail with respect to FIGS. 12, 13, and 14, respectively.

Although FIG. 11 illustrates a particular arrangement of network 900, the present disclosure contemplates that the various embodiments described herein may be applied to a variety of networks having any suitable configuration. For example, network 900 may include any suitable number of wireless devices 910 and network nodes 915, as well as any additional elements suitable to support communication between wireless devices or between a wireless device and another communication device (such as a landline telephone). Furthermore, although certain embodiments may be described as implemented in a LTE network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

Figure 12:
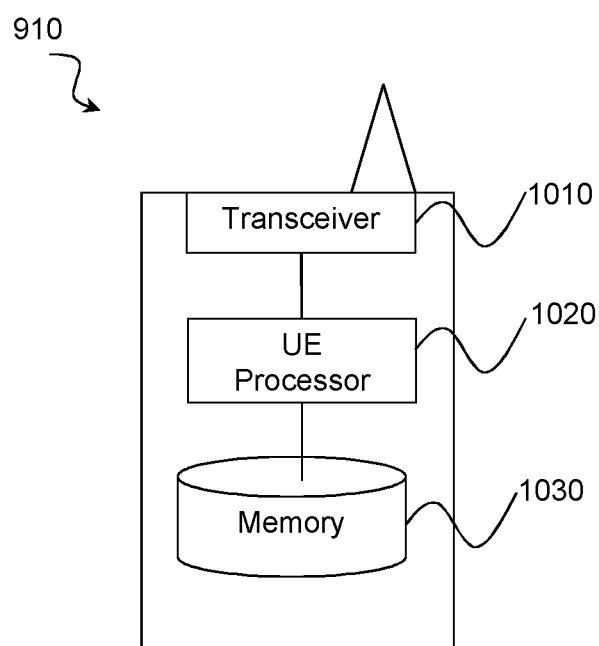
FIG. 12 is a block diagram illustrating an example wireless device for phase noise tracking, in accordance with certain embodiments.

FIG. 12 is a block schematic of an example wireless device 910, in accordance with certain embodiments. As depicted, wireless device 910 includes transceiver 1010, processor 1020, and memory 1030. In some embodiments, transceiver 1010 facilitates transmitting wireless signals to and receiving wireless signals from network node 915 (e.g., via an antenna), processor 1020 executes instructions to provide some or all of the functionality described above as being provided by wireless device 1010, and memory 1030 stores the instructions executed by processor 1020.

Processor 1020 may include any suitable combination of hardware and software implemented in one or more modules to execute instructions and manipulate data to perform some or all of the described functions of wireless device 1010. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 910 may include additional components beyond those shown in FIG. 11 that may be responsible for providing certain aspects of the wireless device's functionality, including any of the functionality described above and/or any additional functionality (including any functionality necessary to support the solution described above).

Figure 13:
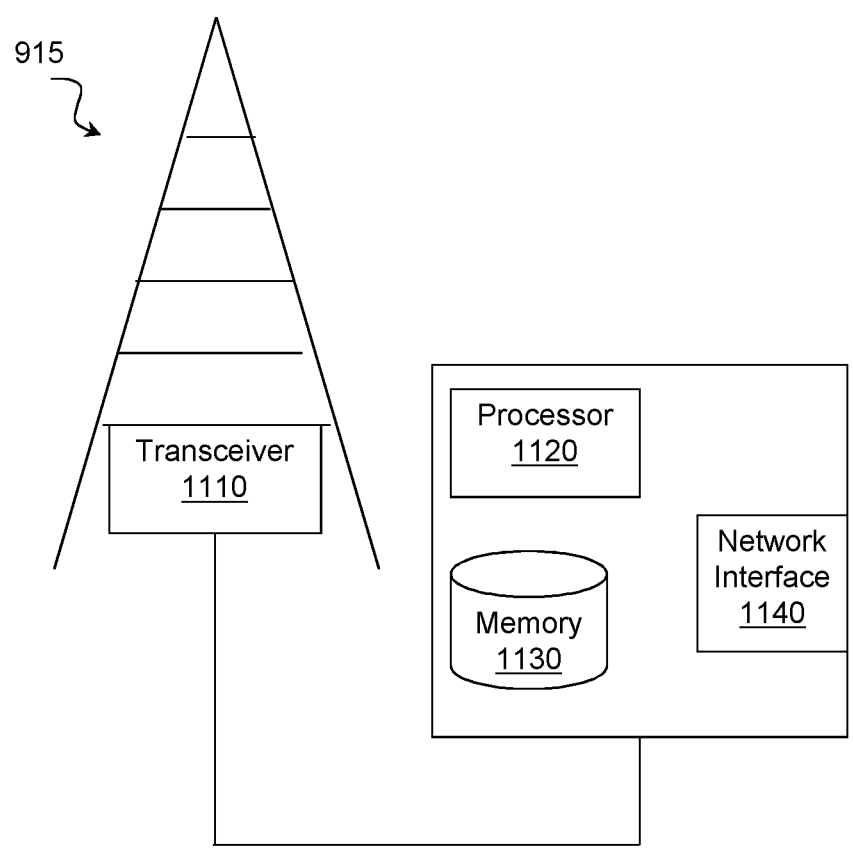
FIG. 13 is a block diagram illustrating an example network node for phase noise tracking, in accordance with certain embodiments.

FIG. 13 is a block schematic of an example network node 915, in accordance with certain embodiments. Network node 915 may be any type of radio network node or any network node that communicates with a wireless device 910 and/or with another network node. Network nodes 915 may be deployed throughout network 900 as a homogenous deployment, heterogeneous deployment, or mixed deployment. A homogeneous deployment may generally describe a deployment made up of the same (or similar) type of network nodes 915 and/or similar coverage and cell sizes and inter-site distances. A heterogeneous deployment may generally describe deployments using a variety of types of network nodes 915 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

As depicted, network node 915 may include one or more of transceiver 1110, processor 1120, memory 1130, and network interface 1140. In some embodiments, transceiver 1110 facilitates transmitting wireless signals to and receiving wireless signals from wireless device 110 (e.g., via an antenna), processor 1120 executes instructions to provide some or all of the functionality described above as being provided by a network node 915, memory 1130 stores the instructions executed by processor 1120, and network interface 1140 communicates signals to backend network components, such as a gateway, switch, router, Internet, Public Switched Telephone Network (PSTN), core network nodes or radio network controllers, etc.

In certain embodiments, network node 915 may be capable of using multi-antenna techniques, and may be equipped with multiple antennas and capable of supporting Multiple Input Multiple Output (MIMO) techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 1120 may include any suitable combination of hardware and software implemented in one or more modules to execute instructions and manipulate data to perform some or all of the described functions of network node 915. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for network node 915, send output from network node 915, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of network node 915 may include additional components beyond those shown in FIG. 13 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 14:
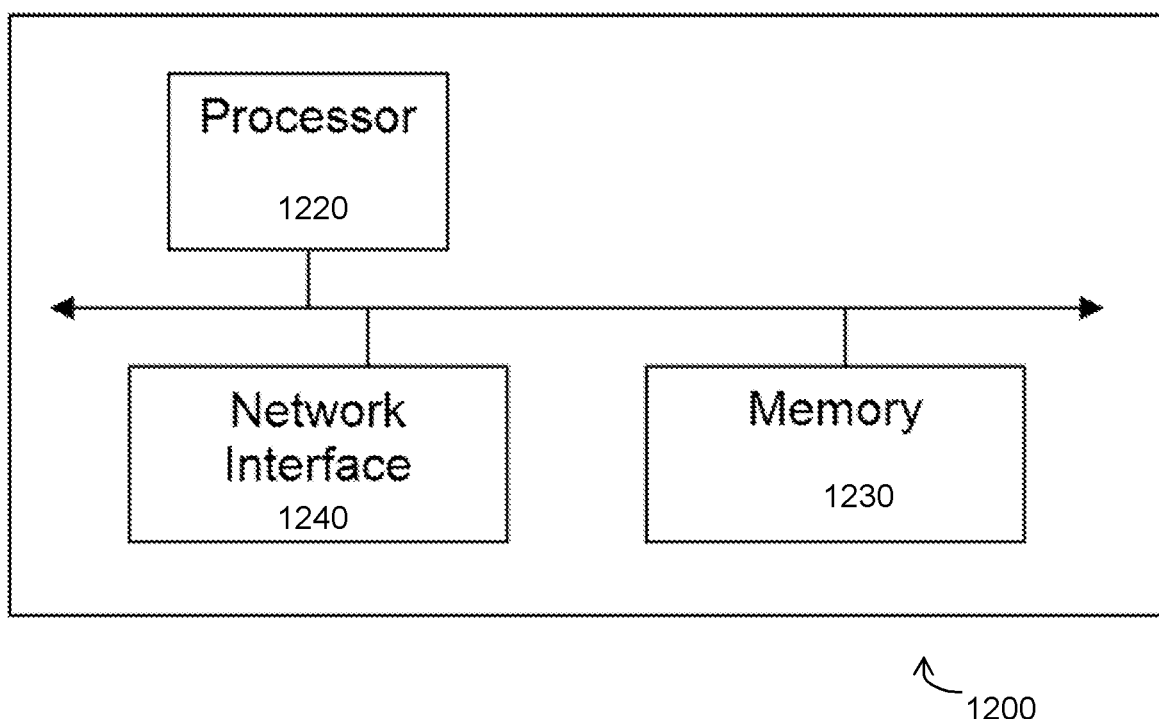
FIG. 14 is a block diagram illustrating an example radio network controller or core network node, in accordance with certain embodiments.

FIG. 14 is a block schematic of an exemplary radio network controller or core network node 1200, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1200 include processor 1220, memory 1230, and network interface 1240. In some embodiments, processor 1220 executes instructions to provide some or all of the functionality described above as being provided by the network node, memory 1230 stores the instructions executed by processor 1220, and network interface 1240 communicates signals to any suitable node, such as a gateway, switch, router, Internet, Public Switched Telephone Network (PSTN), network nodes 915, radio network controllers or core network nodes.

Processor 1220 may include any suitable combination of hardware and software implemented in one or more modules to execute instructions and manipulate data to perform some or all of the described functions of the radio network controller or core network node 1200. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 14 that may be responsible for providing certain aspects of the network node's functionality, including any of the functionality described above and/or any additional functionality (including any functionality necessary to support the solution described above).

According to certain embodiments, a user equipment is provided for use in a cellular network. The user equipment includes a transceiver, a processor, and a memory. The user equipment is configured to determine, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method by a user equipment in a cellular network includes determining, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a network node is provided for use in a cellular network. The network node includes a transceiver, a processor, and a memory. The network node is configured to determine, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method by a network node in a cellular network includes determining, for a data transmission, a mapping form a demodulation reference signal (DMRS) to a PNT-RS. A DMRS resulting signal is generated from a subset of DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method in a wireless transmitter for generating a PNT-RS includes determining a DMRS and a PNT-RS mapping for a data transmission. A DMRS resulting signal is generated from a subset of DMRS for a first resource element in a subcarrier. The DMRS resulting signal signal is copied from the first resource element to a second resource element assigned to the PNT-RS in the subcarrier. The data transmission is transmitted using the DMRS resulting signal and the PNT-RS.

According to certain embodiments, a wireless transmitter for generating a PNT-RS includes a transceiver, a processor, and a memory. The wireless transmitter is configured to determine a DMRS and a PNT-RS mapping for a data transmission. A DMRS resulting signal is generated from a subset of the DMRS for a first resource element in a subcarrier. The DMRS resulting signal is copied from the first resource element to a second resource element assigned to the PNT-RS in the subcarrier. The data transmission is transmitted using the DMRS resulting signal and the PNT-RS.

According to certain embodiments, a method in a wireless receiver for tracking PNT-RS includes performing a first channel estimate on a set of DMRS in a first Orthogonal Frequency Division Multiplexing (OFDM) symbol in a sub-carrier. A first phase noise reference is determined in a first resource element in the first OFDM symbol in the sub-carrier. A second phase noise reference is extracted in a second resource element in a second OFDM symbol in the sub-carrier. A second channel estimate is generated by performing a phase noise compensation of the first channel estimate using said first and second phase reference. Data is received in the second OFDM symbol using the second channel estimate.

According to certain embodiments, a wireless receiver for tracking phase noise tracking reference signal (PNT-RS) includes a transceiver, a processor, and a memory. The wireless receiver is configured to perform a first channel estimate on a set of demodulation reference signals (DMRS) in a first Orthogonal Frequency Division Multiplexing (OFDM) symbol in a sub-carrier. A first phase noise reference is determined in a first resource element in the first OFDM symbol in the sub-carrier. A second phase noise reference is extracted in a second resource element in a second OFDM symbol in the sub-carrier. A second channel estimate is generated by performing a phase noise compensation of the first channel estimate using said first and second phase reference. Data is received in the second OFDM symbol using the second channel estimate.

Certain embodiments of the present disclosure may provide one or more technical advantages. For example, certain embodiments may enable an overhead reduction and better utilization of resources for DMRS, enabling a high number of DMRS early in a sub-frame even in the presence of a substantial number of orthogonal PNT-RS. There is no other known solution when using all resource elements in an OFDM symbol for DMRS while enabling phase noise tracking. Consider, for example, an uplink (UL) (or downlink (DL)) Multi User Multiple Input Multiple Output (MU-MIMO) system with four or more receiver antennas. Therefore, the benefits of having only DMRS in an OFDM symbol such as better peak to average and nice frequency interpolation properties, frequency domain combs are blocked without the herein disclosed systems and techniques.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A user equipment for use in a cellular network, the user equipment comprising a transceiver, a processor, and a memory, the user equipment configured to:
   determine, for a data transmission, a mapping from a demodulation reference signal (DMRS) to a phase noise tracking reference signal (PNT-RS);
   generate a DMRS resulting signal from a subset of DMRS for a first resource element in a subcarrier;
   copy the DMRS resulting signal from the first resource element to a second resource element assigned to the PNT-RS in the subcarrier; and
   transmit the data transmission using the DMRS resulting signal and the PNT-RS.

2. The user equipment of claim 1, wherein the first resource element is associated with a first Orthogonal Frequency Division Multiplexing (OFDM) symbol, and wherein all resource elements associated with the first OFDM symbol are used for the DMRS resulting signal.

3. The user equipment of claim 2, wherein the second resource element is associated with a second OFDM symbol.

4. The user equipment of claim 1, wherein the PNT-RS is continuous in all OFDM symbols of the subcarrier.

5. The user equipment of claim 4, wherein copying the first resource element comprises copying a complex value from the first resource element to each of the OFDM symbols of the subcarrier mapped to the PNT-RS.

6. The user equipment of claim 5, wherein each copy of the complex value is time shifted across the OFDM symbols of the subcarrier mapped to the PNT-RS, wherein each copy is shifted with a CP duration.

7. The user equipment of claim 1, wherein:
   the DMRS resulting signal is generated using Orthogonal Cover Code (OCC) of a length comprising a plurality of adjacent OFDM symbols; and
   wherein copying the DMRS resulting signal comprises for each one of the plurality of adjacent OFDM symbols, copying a respective DMRS resulting into a respective OFDM-symbol.

8. The user equipment of claim 1, wherein the transceiver comprises a multi-antenna receiver.

9. The user equipment of claim 1, wherein the transceiver comprises a multi-antenna transmitter.

10. A method by a user equipment in a cellular network, the method comprising:
    determining, for a data transmission, a mapping from a demodulation reference signal (DMRS) to a phase noise tracking reference signal (PNT-RS);
    generating a DMRS resulting signal from a subset of DMRS for a first resource element in a subcarrier;
    copying the DMRS resulting signal from the first resource element to a second resource element assigned to the PNT-RS in the subcarrier; and
    transmitting the data transmission using the DMRS resulting signal and the PNT-RS.

11. A network node for use in a cellular network, the network node comprising a transceiver, a processor, and a memory, the network node configured to:
    determine, for a data transmission, a mapping from a demodulation reference signal (DMRS) to a phase noise tracking reference signal (PNT-RS);
    generate a DMRS resulting signal from a subset of DMRS for a first resource element in a subcarrier;
    copy the DMRS resulting signal from the first resource element to a second resource element assigned to the PNT-RS in the subcarrier; and
    transmit the data transmission using the DMRS resulting signal and the PNT-RS.

12. The network node of claim 11, wherein the first resource element is associated with a first Orthogonal Frequency Division Multiplexing (OFDM) symbol, and wherein all resource elements associated with the first OFDM symbol are used for the DMRS resulting signal.

13. The network node of claim 12, wherein the second resource element is associated with a second OFDM symbol.

14. The network node of claim 11, wherein the PNT-RS is continuous in all OFDM symbols of the subcarrier.

15. The network node of claim 14, wherein copying the first resource element comprises copying a complex value from the first resource element to each of the OFDM symbols of the subcarrier mapped to the PNT-RS.

16. The network node of claim 15, wherein each copy of the complex value is time shifted across the OFDM symbols of the subcarrier mapped to the PNT-RS, wherein each copy is shifted with a CP duration.

17. The network node of claim 11, wherein:
the DMRS resulting signal is generated using Orthogonal Cover Code (OCC) of a length comprising a plurality of adjacent OFDM symbols; and
wherein copying the DMRS resulting signal comprises for each one of the plurality of adjacent OFDM symbols, copying a respective DMRS resulting into a respective OFDM-symbol.

18. The network node of claim 11, wherein the transceiver comprises a multi-antenna receiver.

19. The network node of claim 11, wherein the transceiver comprises a multi-antenna transmitter.

20. A method by a network node in a cellular network, the method comprising:
determining, for a data transmission, a mapping from a demodulation reference signal (DMRS) to a phase noise tracking reference signal (PNT-RS);
generating a DMRS resulting signal from a subset of DMRS for a first resource element in a subcarrier;
copying the DMRS resulting signal from the first resource element to a second resource element assigned to the PNT-RS in the subcarrier; and
transmitting the data transmission using the DMRS resulting signal and the PNT-RS.

* * * * *

UNITED STATES PATENT AND TRADEMARK OFFICE
CERTIFICATE OF CORRECTION

Page 1 of 2

PATENT NO. : 11,323,300 B2
APPLICATION NO. : 16/076038
DATED : May 3, 2022
INVENTOR(S) : Hessler et al.

It is certified that error appears in the above-identified patent and that said Letters Patent is hereby corrected as shown below:

On the Title Page

Item [57], Under "ABSTRACT", in Column 2, Line 5, delete "mapping form" and insert -- mapping from --, therefor at each occurrence throughout the patent.

In the Specification

Column 4, Line 43, delete "signal signal" and insert -- signal --, therefor.

Column 5, Line 45, delete "is block" and insert -- is a block --, therefor.

Column 6, Line 67, delete "estimated" and insert -- estimate --, therefor.

Column 7, Line 50, delete "generating module 360" and insert -- generating module 350 --, therefor.

Column 7, Lines 52-53, delete "generating module 360" and insert -- generating module 350 --, therefor.

Column 8, Line 43, delete "second determining module 540," and insert -- second performing module 540, --, therefor.

Column 9, Line 41, delete "a generated" and insert -- generated --, therefor.

Column 10, Line 42, delete "generate" and insert -- generate. --, therefor.

Column 10, Line 46, delete "copy" and insert -- copy. --, therefor.

Column 10, Lines 49-50, delete "transmit" and insert -- transmit. --, therefor.

Column 12, Line 54, delete "considering" and insert -- considered --, therefor.

Signed and Sealed this
Eleventh Day of October, 2022

Katherine Kelly Vidal
*Director of the United States Patent and Trademark Office*

Column 13, Line 30, delete "wireless device 1010," and insert -- wireless device 910, --, therefor.

Column 13, Line 35, delete "wireless device 1010." and insert -- wireless device 910. --, therefor.

Column 13, Line 49, delete "and/or or" and insert -- and/or --, therefor at each occurrence throughout the patent.

Column 16, Line 44, delete "signal signal" and insert -- signal --, therefor.